United States Patent
Yoon et al.

(10) Patent No.: US 8,713,588 B2
(45) Date of Patent: *Apr. 29, 2014

(54) INTEGRATED DISK DRIVING MODULE INCLUDING A STEPPING MOTOR INTEGRALLY FORMED WITH A BASE UNIT

(75) Inventors: Hoeop Yoon, Seoul (KR); Sejong Kim, Seoul (KR); Jeongho Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 93 days.

This patent is subject to a terminal disclaimer.

(21) Appl. No.: 13/038,463

(22) Filed: Mar. 2, 2011

(65) Prior Publication Data
US 2011/0219390 A1    Sep. 8, 2011

(30) Foreign Application Priority Data
Mar. 4, 2011  (KR) .......................... 10-2010-0019611

(51) Int. Cl.
*G11B 7/08* (2006.01)
(52) U.S. Cl.
USPC ............................ 720/663; 720/677; 720/697
(58) Field of Classification Search
USPC ................. 720/659–661, 663, 671, 673–680, 720/695–698
See application file for complete search history.

(56) References Cited

U.S. PATENT DOCUMENTS

| | | | |
|---|---|---|---|
| 4,046,432 A * | 9/1977 | Hofmann et al. ............. | 384/510 |
| 6,050,673 A * | 4/2000 | Wada et al. .................... | 347/37 |
| 6,192,023 B1 * | 2/2001 | Seo ................................ | 720/663 |
| 6,275,459 B1 * | 8/2001 | Obata et al. ................... | 720/636 |
| 6,512,734 B1 * | 1/2003 | Chang et al. .................. | 720/675 |
| 2001/0005356 A1 * | 6/2001 | Park .............................. | 369/255 |
| 2006/0200838 A1 * | 9/2006 | Yamanaka et al. ............ | 720/676 |

FOREIGN PATENT DOCUMENTS

| | | |
|---|---|---|
| CN | 1218947 A | 6/1999 |
| CN | 1221181 A | 6/1999 |
| JP | 2004-022101 A | 1/2004 |
| KR | 10-2002-0027718 A | 4/2002 |
| KR | 10-2008-0024799 A | 3/2008 |

OTHER PUBLICATIONS

English translation of JP 2004022101 A.*
Office Action dated Jun. 20, 2013 in Chinese Application No. 201110052120.2, filed Mar. 4, 2011.
Office Action dated May 17, 2011 in Korean Application No. 10-2010-0019611, filed Mar. 4, 2010.

* cited by examiner

*Primary Examiner* — Nathan Danielsen
(74) *Attorney, Agent, or Firm* — Saliwanchik, Lloyd & Eisenschenk (57) ABSTRACT

An integrated disk driving module is disclosed, the module including a base unit including a stepping motor fixture bent from an upper plate toward an accommodation space, wherein the stepping motor fixture is integrally formed with the upper plate, and a stepping motor rotatably fixed to the stepping motor fixture.

11 Claims, 6 Drawing Sheets

INTEGRATED DISK DRIVING MODULE INCLUDING A STEPPING MOTOR INTEGRALLY FORMED WITH A BASE UNIT

CROSS-REFERENCE TO RELATED APPLICATION

This application claims the benefit under 35 U.S.C. §119 of Korean Application No. 10-2010-0019611, filed Mar. 4, 2010, which is hereby incorporated by reference in its entirety.

BACKGROUND OF THE DISCLOSURE

1. Field of the Invention

The present disclosure relates to an integrated disk driving module.

2. Description of Related Art

In general, an ODD (Optical Disk Driver) stores huge data on a disk, and reads the data stored in the disk.

The ODD largely includes a base body, a spindle motor coupled to the base body via a coupling screw, a stepping motor coupled to the base body via a coupling screw, and an optical pickup module storing data on a disk or reading the data from the disk.

The spindle motor is coupled to the base body via a mounting plate, and rotates an optical disk for storing data or an optical disk stored with data at a high speed.

The stepping motor is coupled to the base body via a mounting plate, and feeds the optical pickup module to a radial direction of the optical disk.

The optical pickup module is coupled to a guide shaft coupled to the base body via a coupling screw and slides along the guide shaft by rotation of a lead screw of the stepping motor. The optical pickup module slides along the guide shaft to store data on the optical disk and reads the data stored in the optical disk.

A stepping motor of an optical disk apparatus according to prior art is coupled to a base body via a mounting plate and a coupling screw to the disadvantage of increasing the number of parts comprising the optical disk apparatus.

The conventional optical disk apparatus is disadvantageous in that the number of parts is increased to take many hours for assembly.

The conventional optical disk apparatus is further disadvantageous in that product characteristics decrease due to manufacturing tolerances of the base body and the stepping motor.

The conventional optical disk apparatus is still further disadvantageous in that the stepping motor is coupled to the base body via a coupling screw to result in frequent assembly badness in which the stepping motor is not mounted at a designated position, and a lead screw of the stepping motor and a guide shaft of the optical pickup module are not arranged in parallel.

The conventional optical disk apparatus is still further disadvantageous in that a mounting plate for coupling the stepping motor to the base body is needed to increase size and weight of the optical disk apparatus and to be prone to external shock.

BRIEF SUMMARY

The present disclosure is to provide an integrated disk driving module configured to reduce the number of parts by integrally forming a stepping motor to a base unit, to reduce assembly time as a result of reduced number of parts, to improve product performance as a result of reduced assembly tolerances, to inhibit incomplete assembly by arranging the stepping motor at a designated position and to reduce size and weight.

An object of the present disclosure is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present disclosure, there is provided an integrated disk driving module, the module comprising: a base unit including a stepping motor fixture bent from an upper plate toward an accommodation space, wherein the stepping motor fixture is integrally formed with the upper plate; and a stepping motor rotatably fixed to the stepping motor fixture.

Technical problems to be solved by the present disclosure are not restricted to the above-mentioned, and any other technical problems not mentioned so far will be clearly appreciated from the following description by those skilled in the art.

DETAILED DESCRIPTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Figure 1:
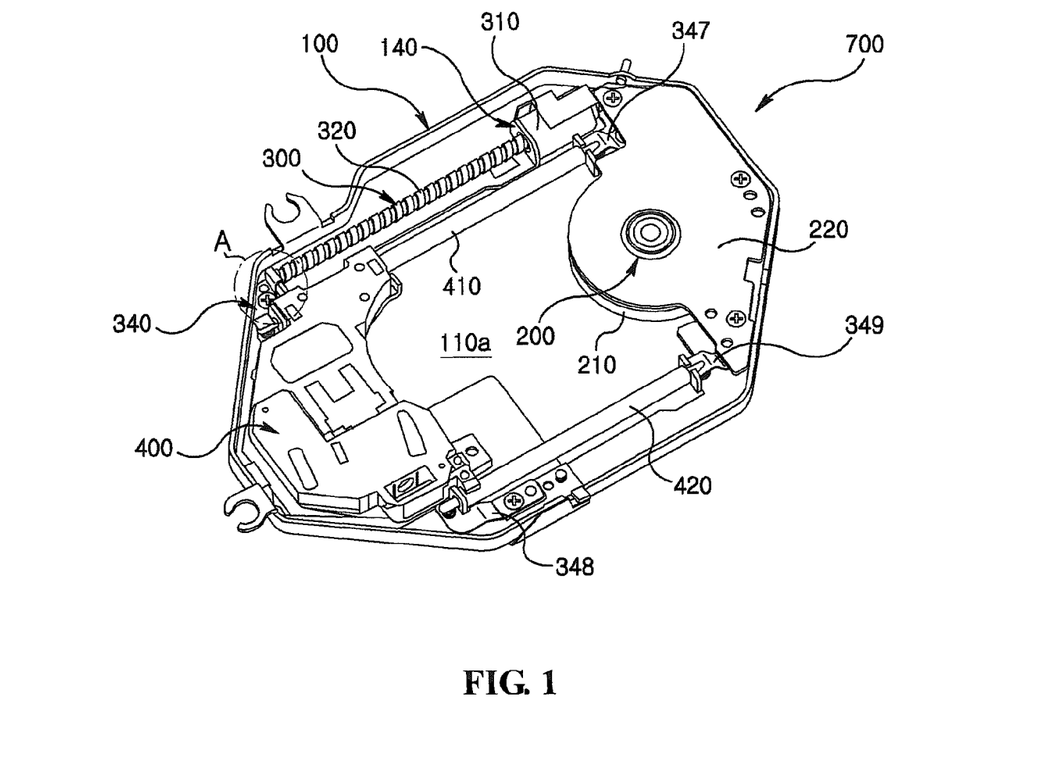
FIG. 1 is a rear perspective view of an integrated disk driving module according to an exemplary embodiment of the present invention.

FIG. 1 is a rear perspective view of an integrated disk driving module according to an exemplary embodiment of the present invention.

Referring to FIG. 1, an integrated disk driving module (700) may include a base unit (100), a spindle motor (200) and a stepping motor (300). The integrated disk driving module (700) may further include an optical pickup module (400).

Figure 2:
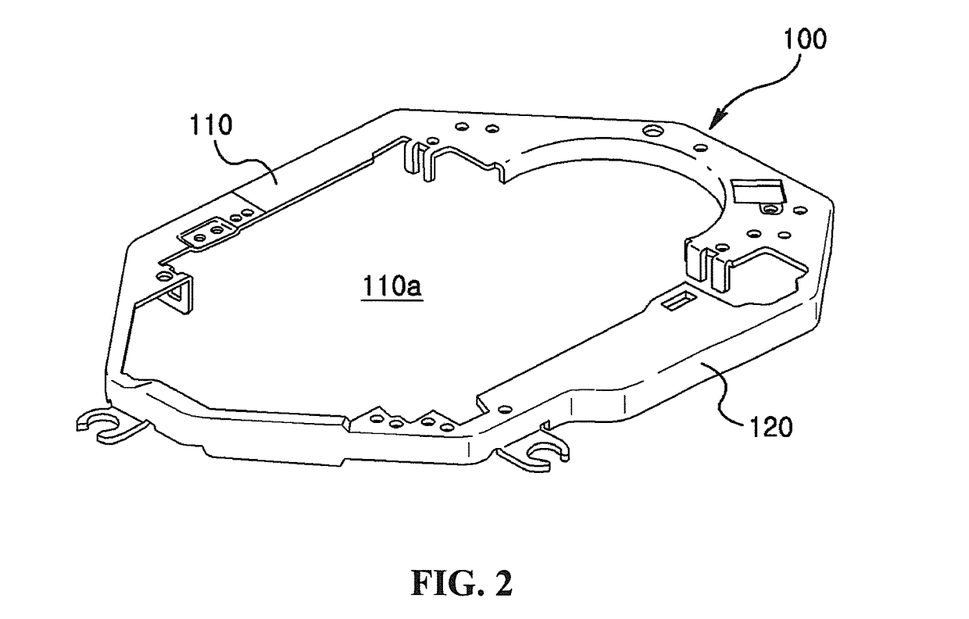
FIG. 2 is a front perspective view of a base unit of FIG. 1.
Figure 3:
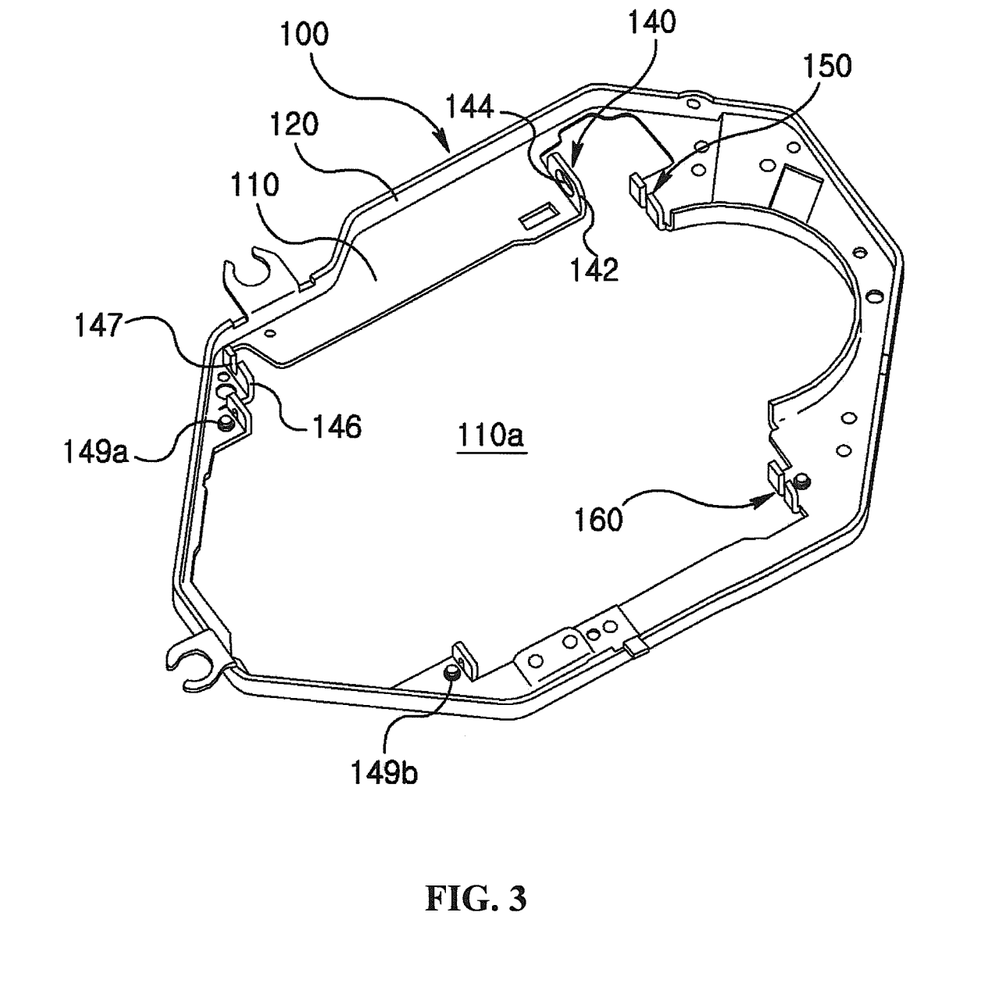
FIG. 3 is a rear perspective view of a base unit of FIG. 1.

Referring to FIGS. 2 and 3, the base unit (100) includes an upper plate (110), a lateral surface plate (120) and a stepping motor fixture (140). The base unit (100) may further include first and second guide shaft fixtures (150, 160).

The upper plate (110) includes a metal plate, and is centrally formed with an opening (110a), where part of the opening (110a) is formed in the shape of a half circle when viewed from a plane, for accommodating a spindle motor (200, described later).

The opening (110a)-formed upper plate (110) may take the shape of an octagonal plate when viewed from a plane. Although the present exemplary embodiment of the present disclosure describes the upper plate (110) of an octagonal plate, the shape of the upper plate (110) may take various shapes based on arrangement and shape of the spindle motor (200, described later), the stepping motor (300) and the optical pickup module (400).

A lateral plate (120) is bent from an edge of the upper plate (110) to one direction of the upper plate (110), and an accommodation space is formed at the base unit (100) by the upper plate (110) and the lateral plate (120). In the present exemplary embodiment, the lateral plate (120) is formed perpendicularly to the upper plate (110), for example.

The stepping motor fixture (140) functions to secure the stepping motor (300, described later) at the base unit (100), and in the present exemplary embodiment, the stepping motor fixture (140) is integrally formed with the upper plate (110).

The stepping motor fixture (140) integrally formed with the upper plate (110) is bent in a pair from the upper plate (110) toward the accommodation space, and each of the pair of stepping motor fixtures (140) faces the other inside the accommodation space.

Now, the pair of stepping motor fixtures (140), each fixture facing the other fixture, is defined by a first fixture (142) and a second fixture (146), where the first and second fixtures (142, 146) are formed in parallel on the upper plate (110).

The first fixture (142) is bent from the upper plate (110) to a direction facing the accommodation space, and the second fixture (146) is perpendicularly bent from the upper plate (110), for example.

The first fixture (142) is centrally formed with a circle-shaped through hole (144), for example. Alternatively, the through hole (144) formed at the first fixture (142) may take the shape of an oblong or a slit, in addition to the circle shape. The through hole (144) of the first fixture (142) is passed by a lead screw comprising the stepping motor (300, described later), whereby one lateral end of the lead screw is rotatably supported by the first fixture (142).

The second fixture (146) facing the first fixture (142) is bent from the upper plate (110) toward the accommodation space, and the second fixture (146) is perpendicularly bent from the upper plate (110), for example.

An upper surface of the second fixture (146) bent from the upper plate (110) is formed with an insertion groove (147) concavely formed toward a bottom surface opposite to the upper surface from the upper surface of the second fixture (146). The insertion groove (147) formed at the second fixture (146) rotatably supports the other side facing the one lateral end of the lead screw which is part of the stepping motor (300, described later).

Although the present exemplary embodiment describes and illustrates the first fixture (142) formed with the through hole (144) and the second fixture (146) formed with the insertion groove (147), it should be apparent that the first fixture (142) and the second fixture (146) may be respectively formed with the insertion groove (147), and the first fixture (142) and the second fixture (146) may be respectively formed with the through hole (144).

Referring to FIG. 3 again, the upper plate (110) is formed with a first guide shaft fixture (150) and a second shaft fixture (160) to secure first and second guide shafts (described later). Each of the first and second shaft fixtures (150, 160) is formed at each side of the upper plate (110) of the base unit (100).

The first guide shaft fixture (150) is integrally formed with the upper plate (110) of the base unit (100), and functions to secure a first guide shaft (410, see FIG. 4a) of the optical pickup module (400, described later) to the base unit (100).

The first guide shaft fixture (150) is formed in a pair on the upper plate (110), each facing the other fixture, and each of the pair of first guide shaft fixtures (150) is bent from the upper plate (110) toward the accommodation space, where each of the pair of first fixture (142) and the second fixture (146) is arranged in parallel with the first fixture (142) and the second fixture (146) of the stepping motor fixture (140).

One of the first guide shaft fixtures (150) arranged near to the first fixture (142) of the stepping motor fixture (140) is formed with an insertion groove into which a first distal end of the first guide shaft (410, see FIG. 4a) is inserted.

The remaining one of the first guide shaft fixtures (150) arranged near to the second fixture (146) of the stepping motor fixture (140) is formed with a through hole through which a second distal end facing the first distal end of the first guide shaft (410, see FIG. 4a) passes. The through hole for passing the second distal end of the first guide shaft (410) may take the shape of an oblong or a slit.

Furthermore, coupling holes are formed at positions facing first and second distal ends (411, 412) of the first guide shaft (410) protruded outside of the first guide shaft fixtures (150) on the upper plate (110), where each of the coupling holes is formed with a height adjustment screw (149a). The height adjustment screw (149a) adjusts a height of the first guide shaft (410) relative to the upper surface (110).

The second shaft fixture (160) arranged in parallel with the first guide shaft fixture (150) is formed at the upper plate (110) of the base unit (100), and functions to secure a second guide shaft (420, described later and see FIG. 4a) to the upper plate (110) of the base unit (100).

The second guide shaft fixture (160) is arranged on the upper plate (110) in a pair, each facing the other, and each of the pair of second guide shaft fixtures (160) is bent from the upper plate (110) toward the accommodation space, and arranged in parallel with the first and second fixtures (142, 146) of the stepping motor fixture (140).

One of the pair of second guide shaft fixtures (160) is formed with an insertion groove through which a third distal end of the second guide shaft (420, described later) is inserted. The remaining one of the pair of second guide shaft fixtures (160) in the stepping motor fixtures (140) is formed with a through hole through which a fourth distal end facing the third distal end of the second guide shaft (420, described later) passes.

In the present exemplary embodiment, the through hole for passing the fourth distal end of the second guide shaft (420) may take the shape of an oblong or a slit.

Coupling holes are formed at positions facing third and fourth distal ends (421, 422) of the second guide shaft (420) protruded outside of the second guide shaft fixtures (160) on the upper plate (110), where each of the coupling holes is formed with a height adjustment screw (149b). The height adjustment screw (149b) adjusts a height between second guide shaft (420) and the upper surface (110).

Referring to FIGS. 1 and 2 again, the spindle motor (200) is mounted at a part of the opening formed in the shape of a half circle at the upper plate (110) of the base unit (100).

A body (210) of the spindle motor (200) is mounted at a mounting plate (220) which in turn is coupled to the upper plate (110) of the base unit (100) via a plurality of coupling screws.

In the present exemplary embodiment, the spindle motor (200) may take various shapes, and the configuration of the spindle motor (200) in one exemplary embodiment is not particularly restricted.

Figure 4A:
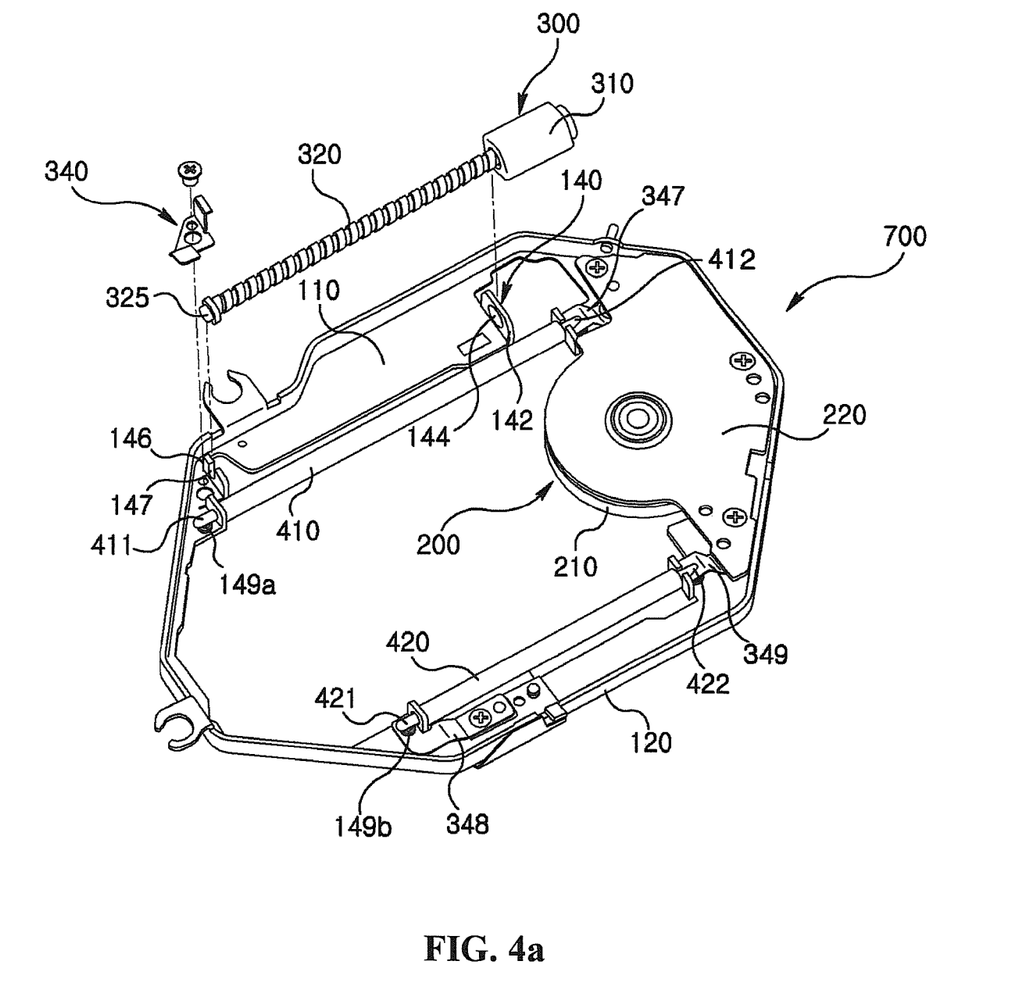
FIG. 4a is an exploded perspective view of a stepping motor coupled to the base unit of FIG. 3.

FIG. 4a is an exploded perspective view of a stepping motor coupled to the base unit of FIG. 3.

Referring to FIGS. 3 and 4a, the first fixture (142) and the second fixture (146) of the stepping motor fixture (140) of the base unit (100) is coupled with the stepping motor (300). The stepping motor (300) includes a stepping motor body (310), a lead screw (320) and a pivot member (325).

The stepping motor body (310) includes a stator (not shown), and the lead screw (320) is rotated in cooperation with the stator. In the present exemplary embodiment, the stepping motor body (310) and the lead screw (320) may take various shapes, and the configuration of the stepping motor body (310) in one exemplary embodiment of the present disclosure is not particularly restricted.

The lead screw (320) is formed to radial direction of an optical disk (not shown) secured at a disk fixture device (220).

One lateral end of the lead screw (320) is rotatably supported by the first fixture (142) through the through hole (144) of the first fixture (142) of the stepping motor fixture (140), and the other lateral end facing the lateral end of the lead screw (320) is inserted into the insertion groove (147) of the second fixture (146) of the stepping motor fixture (140) to be rotatably supported by the second fixture (146).

The pivot member (325) is coupled to the other lateral end of the lead screw (320) and is secured at the insertion groove (147) of the second fixture (146) of the stepping motor fixture (140). The pivot member (325) may further include a clip unit (325a, see FIG. 5) inserted into the second fixture (146) perpendicularly bent from the upper plate (110) of the base unit (100).

Figure 4B:
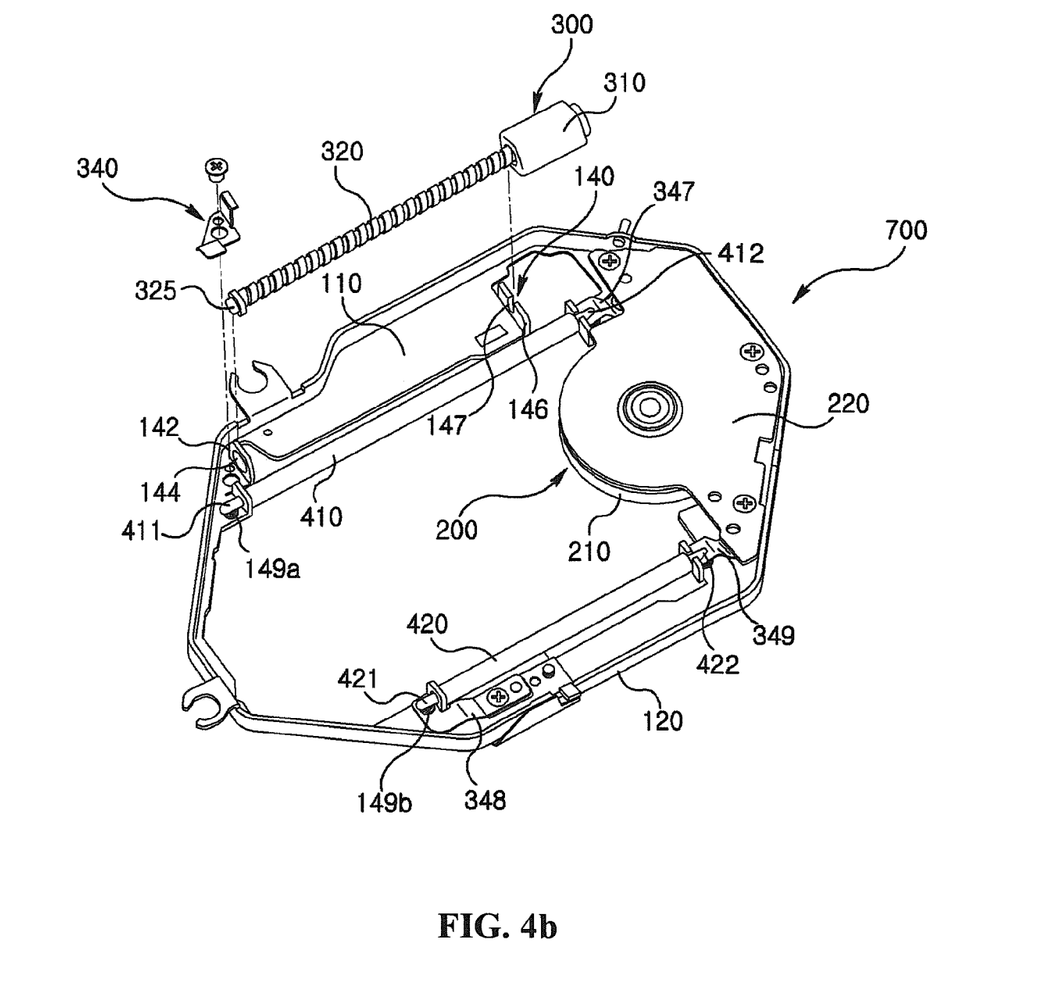
FIG. 4b is an exploded perspective view of a stepping motor coupled to the base unit of FIG. 3 according to another exemplary embodiment of the present disclosure.

Meanwhile, as illustrated in FIG. 4b, it may be possible that the first fixture (142) having the through hole (144) and the second fixture (146) having the insertion groove (147) are at positions opposite to those of the first fixture (142) and the second fixture (146) formed at the upper plate (110) of the base unit (100) illustrated in FIG. 4a.

Referring to FIGS. 1 and 4a again, the integrated disk driving module (700) according to an exemplary embodiment of the present disclosure may include the optical pickup module (400). The optical pickup module (400) is reciprocally moved along a radial direction of the disk by the lead screw of the stepping motor (300) secured at the upper plate (110) of the base unit (100), the first and second guide shafts (410, 420) arranged in parallel with the lead screw (320).

The first guide shaft (410) is slidably coupled to one side of the optical pickup module (400), and is formed with the first distal end (411) and the second distal end (412) facing the first distal end (411). The first and second distal ends (411, 412) of the first guide shaft (410) are coupled to the pair of first guide shaft fixtures (150).

The second guide shaft (420) is slidably coupled to the other side facing the one lateral end of the optical pickup module (400), and is formed with a third distal end (421) and a fourth distal end (422) facing the third distal end (421). The third and fourth distal ends (421, 422) of the second guide shaft (420) are coupled to the pair of second guide shaft fixtures (160).

Referring to FIG. 1 again, the first distal end (411) of the first guide shaft (410) is formed with a first pressure member (340) to inhibit the first and second distal ends (411, 412) of the first guide shaft (410) from disengaging, and the second distal end (412) is formed with a second pressure member (347).

The third distal end (421) of the second guide shaft (420) is formed with a third pressure member (348) to inhibit the third and fourth distal ends (421, 422) of the second guide shaft (420) from disengaging, and the fourth distal end (422) is formed with a fourth pressure member (349).

Each of the first to fourth pressure members (340, 347, 348, 349) takes the shape of a leaf spring, and each distal end of the first to fourth pressure members (340, 347, 348, 349) is secured at the upper plate (110), and each other distal end facing the each distal end of the first to fourth pressure members (340, 347, 348, 349) applies pressure to the first to fourth distal ends (411, 412, 421, 422).

Figure 5:
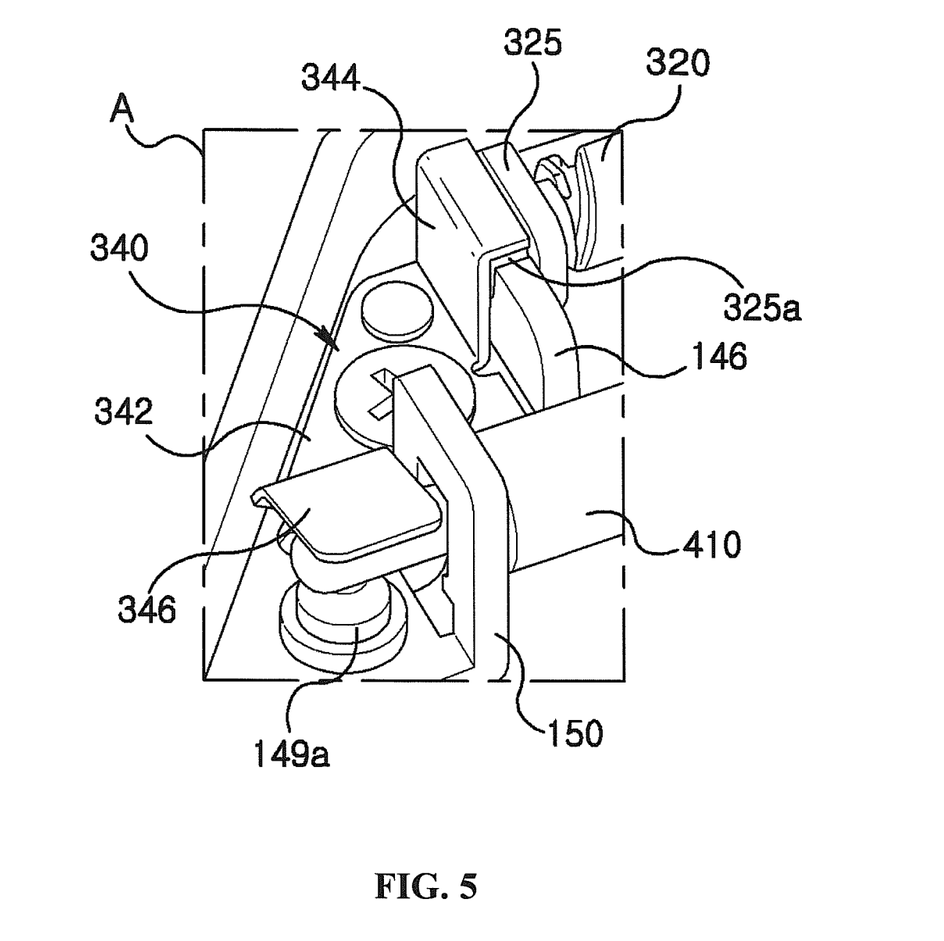
FIG. 5 is a partially enlarged view of 'A' of FIG. 1.

FIG. 5 is a partially enlarged view of 'A' of FIG. 1.

Referring to FIGS. 1 and 5, the clip unit (325a) of the pivot member (325) secured at the second fixture (146) of the stepping motor fixture (140) and the first distal end (411) of the first guide shaft (410) secured at the first guide shaft fixture (150) are arranged nearby therebetween, such that a single pressure member (340) can simultaneously apply pressure to the clip unit (325a) of the pivot member (325) and the first distal end (411) in the present exemplary embodiment of the present disclosure.

To this end, the pressure member (340) may include a body (342), a first pressure unit (344) and a second pressure unit (346). The body (342) takes the shape of a plate and is secured at the upper plate (110) of the base unit (100) via a coupling screw. The first pressure unit (344) is extended and bent from the body (342) to apply pressure to the pivot member (325), and the second pressure unit (346) is extended and bent from the body (342) to apply pressure to the first distal end (411) of the first guide shaft (410).

As apparent from the foregoing, the integrated disk driving module according to present disclosure has an advantageous effect in that a stepping motor fixture is formed at a base unit for mounting a lead screw of a stepping motor, and the stepping motor fixture is mounted with the lead screw coupled to the stepping motor to reduce the number of parts of the integrated disk driving module, assembly time as a result of reduced number of parts, to improve product performance as a result of reduced assembly tolerances, to inhibit incomplete assembly by arranging the stepping motor at a designated position and to reduce size and weight.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. An integrated disk driving module, the module comprising:
   a base unit including a stepping motor fixture bent from an upper plate toward an accommodation space and the stepping motor fixture is integrally formed with the upper plate;
   a stepping motor rotatably fixed to the stepping motor fixture and including a lead screw and a pivot member arranged on a distal end of the lead screw to be fixed at the stepping motor fixture, the pivot member including a clip unit coupled to the stepping motor fixture by press-fitting;
   an optical pickup module fed by the stepping motor;
   first and second guide shafts coupled to the upper plate of the base unit to guide the optical pickup module, the base unit further including a pair of guide shaft fixtures bent from the upper plate to a direction of the accommodation space for respectively fixing a first distal end of the first guide shaft and a second distal end of the first guide shaft, and a pair of second guide shaft fixtures bent from the upper plate to the direction of the accommodation space for respectively fixing a third distal end of the second guide shaft and a fourth distal end of the second guide shaft; and
   a first pressure member configured to press the clip unit and the first distal end of the first guide shaft near the clip unit,
   wherein the stepping motor fixture includes:
      a first fixture rotatably supporting one lateral end of the lead screw; and
      a second fixture rotatably supporting the other lateral end facing the one lateral end,
   wherein the first fixture is formed with a through hole through which the one lateral end of the lead screw passes,
   wherein the second fixture is formed with an insertion hole through which a periphery of the other lateral end of the lead screw is inserted,
   wherein the through hole of the first fixture has an oblong shape,
   wherein the clip unit is protruded from a front face of the pivot member, and
   wherein the first pressure member includes:
      a body fixed at the upper plate,
      a first pressure unit extended and bent from the body to press to the clip unit, and
      a second pressure unit extended and bent from the body to press to the first distal end of the guide shaft near the clip unit.

2. The integrated disk driving module of claim 1, wherein the base unit includes a lateral surface plate bent from an edge of an opening-formed upper plate to form the accommodation space.

3. The integrated disk driving module of claim 2, wherein each of the stepping motor fixtures is arranged on a straight line, each in parallel with the other.

4. The integrated disk driving module of claim 1, wherein the stepping motor fixture is formed in a pair from the upper plate, each facing the other.

5. The integrated disk driving module of claim 1, wherein the insertion hole is an insertion groove.

6. The integrated disk driving module of claim 1, further comprising a spindle motor mounted at the mounting plate coupled to the upper plate via a coupling screw.

7. The integrated disk driving module of claim 1, wherein one of first guide shaft fixtures fixed to the first distal end is formed with a through hole through which the first distal end passes, and the remaining one first guide shaft fixture fixed to the second distal end is formed with an insert groove through which the second distal end is inserted.

8. The integrated disk driving module of claim 1, wherein one of second guide shaft fixtures fixed to the third distal end is formed with a through hole through which the third distal end passes, and the remaining one second guide shaft fixture fixed to the fourth distal end is formed with an insert groove through which the fourth distal end is inserted.

9. The integrated disk driving module of claim 1, further comprising:
   a second pressure member fixed at the upper plate for applying pressure to the second distal end,
   a third pressure member fixed at the upper plate for applying pressure to the third distal end, and
   a fourth pressure member fixed at the upper plate for applying pressure to the fourth distal end.

10. The integrated disk driving module of claim 9, wherein each of the first through fourth pressure members includes a leaf spring.

11. The integrated disk driving module of claim 1, further comprising:
   a height adjustment screw coupled to the upper plate of the base unit to adjust heights of the first and second distal ends of the first guide shaft, and coupled to the upper plate of the base unit to adjust heights of the third and fourth distal ends of the second guide shaft.

* * * * *